W. McFARLAND.
Cupola Furnace.
No. 22,257.
Patented Dec. 7, 1858.
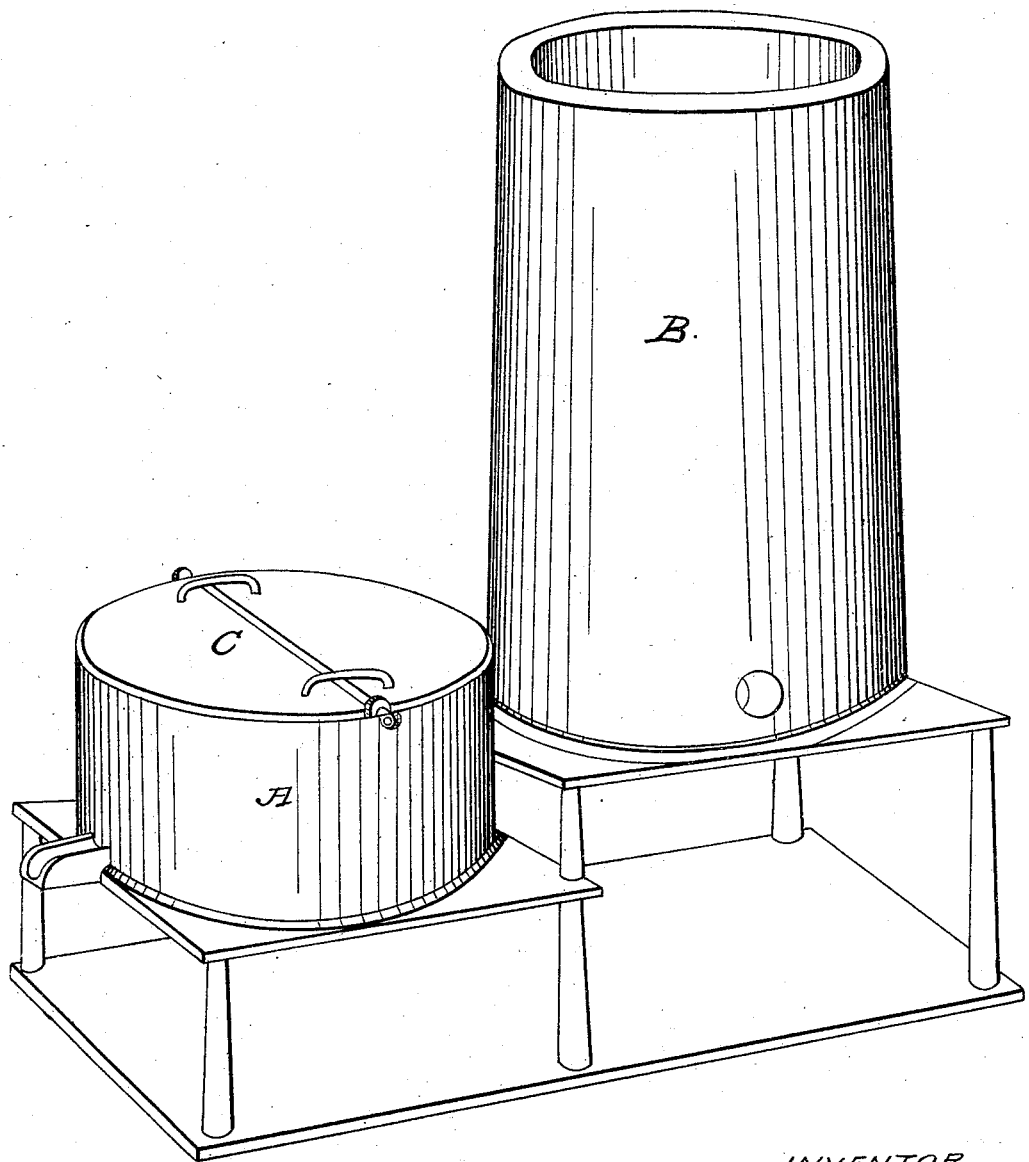

UNITED STATES PATENT OFFICE.

WILLIAM McFARLAND, OF ST. LOUIS, MISSOURI.

IMPROVEMENT IN FURNACES FOR MELTING IRON.

Specification forming part of Letters Patent No. 22,257, dated December 7, 1858.

*To all whom it may concern:*

Be it known that I, WILLIAM MCFARLAND, of St. Louis, in the county of St. Louis and State of Missouri, have invented a new and useful Improvement in Cupola-Furnaces; and I do hereby declare that the following is a full, clear, and exact description of the same, reference being had to the accompanying drawings, forming a part of this specification, in which a perspective view of my improvement is shown.

The object of my invention is to prevent the collecting of the melted metal in the bottom of the furnace, and thereby keep the furnace free and in good melting order.

The nature of my invention consists in attaching a reservoir to the furnace to extend below the level of the bottom, for the purpose of receiving the metal as fast as it is melted.

To carry out my invention, I construct a reservoir, A, of the same material as the furnace B, and attach it to the side of the furnace by means of a pipe, which is located in such a position that the bottom of the furnace shall be nearly on a level with the top of the reservoir. The interior of reservoir and conducting-pipe a, I line with fire-brick, the same as the furnace, and the top, C, of the reservoir I make of cast-iron, and coat the lower side with clay, so as to form a clay joint, and fasten the top securely down. The bottom of the reservoir I make to drop in the same manner as the furnace-bottom.

The advantages resulting from my improvement are these: a saving in fuel, a saving in iron, a saving in time, and a saving of labor.

In the common cupola-furnace the melted metal and slag are collected in the interstices between the coal below the tuyeres; and for the purpose of making room enough to hold the metal required the tuyeres are placed from ten to twenty-four inches above the bottom, according to the kind of work made. With my reservoir attached six inches is all the space required below the tuyeres, thereby saving from four to eighteen inches of fuel in the bed.

In the common cupola-furnace as the melted metal accumulates and rises, the slag, being lightest, floats on the surface and is carried upward among the coal. As it approaches the tuyeres, the direct action of the blast on it chills some and turns it black, thus forming a nucleus for more to accumulate as it ascends or descends. This again forms an obstruction to the melted metal as it drops down, some of which is chilled by coming in contact with the cold slag. The chilled iron and slag thus keep accumulating all through the heat, and it frequently happens that a furnace which will hold twelve hundred pounds of melted iron at the beginning will not hold two hundred pounds at the end of a heat, and that having lost its fluidity to such a degree (by coming in contact with so much dead matter in the bottom of the furnace) as not to be fit for casting. With my reservoir attached that difficulty is obviated, as the melted iron and slag flow into the reservoir immediately on reaching the bottom of the furnace, thereby keeping the furnace cleaner and in better melting order.

In the common furnace, owing to the accumulation of chilled iron and slag, the blast is obstructed so it cannot pass through the fuel freely, thereby impairing its melting properties and rendering the metal less fluid. With my reservoir attached, the iron and slag having free egress from the furnace, less obstruction is offered to the blast, it circulates through the fuel better, effecting a more perfect combination, and with less fuel melts quicker, and the melted metal is of a more uniform temperature throughout.

In the common furnace the accumulation of chilled iron around its sides renders it difficult to be cleaned out, and the fire-brick lining is often broken during the process. With my reservoir attached no iron is chilled against the sides; consequently it can be cleaned out quicker and without injury to the lining.

The stock remaining in the common furnace after a heat, consisting of iron, coal, and slag, is dropped, and after the largest pieces of coal and iron are picked out the balance is put in a mill and ground to separate the small particles of iron from the slag and fine coal with which it is mixed. By this process from two hundred to five hundred pounds of iron are saved, according to the size of the furnace and quantity melted. With my reservoir attached there is much less stock left after a heat, owing to the tuyeres being lower and the slag escaping freely from the furnace. Owing to the ready escape of the metal also, very little is left remaining in the stock after a heat, the amount after grinding being about eighty per cent. less than when the reservoir is not used. One reservoir may be attached to several furnaces at the same time, thereby collecting enough metal for the heaviest castings without handling it, thus obviating in a great measure the labor and danger consequent on handling large bodies of melted metal by means of cranes.

In the common furnace the obstruction offered to the blast by the accumulation of chilled iron and slag toward the last of a heat renders it necessary sometimes to substitute blowing-cylinders (at considerable expense) for the fan-blower. By the use of my reservoir less obstruction is offered by the blast, the fan-blower can be used to more advantage, and the necessity of substituting blowing-cylinders avoided.

I am aware that J. G. Martien obtained a patent in 1857 on a cupola-furnace; also, that Richard Savary obtained a patent in 1856 on a cupola-furnace, but neither of those arrangements embrace my invention; but if they did they, as well as all similar furnaces, would be greatly improved in their operation. The patent of Martien is for an improvement in the manufacture of steel and wrought-iron from cast-iron by the application of atmospheric air, &c. By his plan any of the common furnaces may be used, the iron being collected in the usual manner in the bottom of the furnace, and after a sufficient quantity is thus collected, then it is tapped from the furnace and conveyed by means of a trough or conductor to the receptacle or purifying furnace, to be operated on in a particular manner. The patent of Richard Savary is for an improvement in the manufacture of wrought-iron by using a cupola-furnace in connection with a group of puddling-furnaces. He also collects the melted metal in the usual manner in the bottom of the furnace, and then, after having collected a sufficient quantity, he taps it from the furnace and conducts by a trough or conduit to his puddling-furnaces, to be changed into wrought-iron. These furnaces do just what my improvement is calculated to obviate. I collect nothing in the bottom of my furnace, but collect the iron and slag in the reservoir as fast as it is melted, thereby keeping my furnace free and in good working order.

There has always been more or less difficulty experienced by iron-founders in the management of cupola-furnaces, caused by collecting the iron and slag in the bottom of the furnace among the fuel, because as the iron rises in the furnace the slag is carried upward through the body of the coal, denominated the "bed." When the iron is tapped from the furnace, the slag, being less fluid and of a sticky nature, does not settle with the iron, but adheres more or less to the coal, coating it and injuring the bed. Each time it rises more accumulates, and the action of the blast on the slag chills it, thereby forming a large body of dead matter in the furnace, curtailing its capacity, and interfering with the melting.

What I claim as my invention, and desire to secure by Letters Patent, is—

The combination of a reservoir, A, with a cupola-furnace, B, so as to collect the metal as fast as melted, substantially as and for the purposes set forth.

WILLIAM McFARLAND.

Witnesses:
   JNO. P. BELTON,
   WM. STOOPS.